United States Patent [15] 3,662,117

Bhatt et al. [45] May 9, 1972

[54] CROSSTALK MINIMIZATION IN MULTI-WIRE NETWORKS

[72] Inventors: Jayantkumar Bhatt, Ottawa, Ontario; John George Mlacak, Kanata, Ontario; Thomas Arthur Winlow, Ottawa, Ontario, all of Canada

[73] Assignee: Northern Electric Company Limited, Montreal, Quebec, Canada

[22] Filed: Dec. 3, 1970

[21] Appl. No.: 94,800

[52] U.S. Cl. ....... 179/18 GF, 340/166

[51] Int. Cl. ....... H04q 3/50

[58] Field of Search ....... 179/18 GE, 18 GF, 18 AF; 340/166

[56] References Cited

UNITED STATES PATENTS

| | | | |
|---|---|---|---|
| 3,456,084 | 7/1969 | Haselton | 179/18 GF |
| 3,457,551 | 7/1969 | Bobeck | 340/166 |

*Primary Examiner*—Kathleen H. Claffy
*Assistant Examiner*—William A. Helvestine
*Attorney*—John E. Mowle

[57] ABSTRACT

The crosstalk in a two-wire network is minimized by cancelling the crosstalk signal at every crosspoint. This is achieved by providing each crosspoint of a two-wire network with a pair of capacitive elements each having substantially the same capacitance as that of a non-actuated switch used for the crosspoint. These elements are connected at the pair of intersections of the horizontal and vertical conductors of the crosspoint other than those at which the switches are connected.

5 Claims, 3 Drawing Figures

Figure 1:
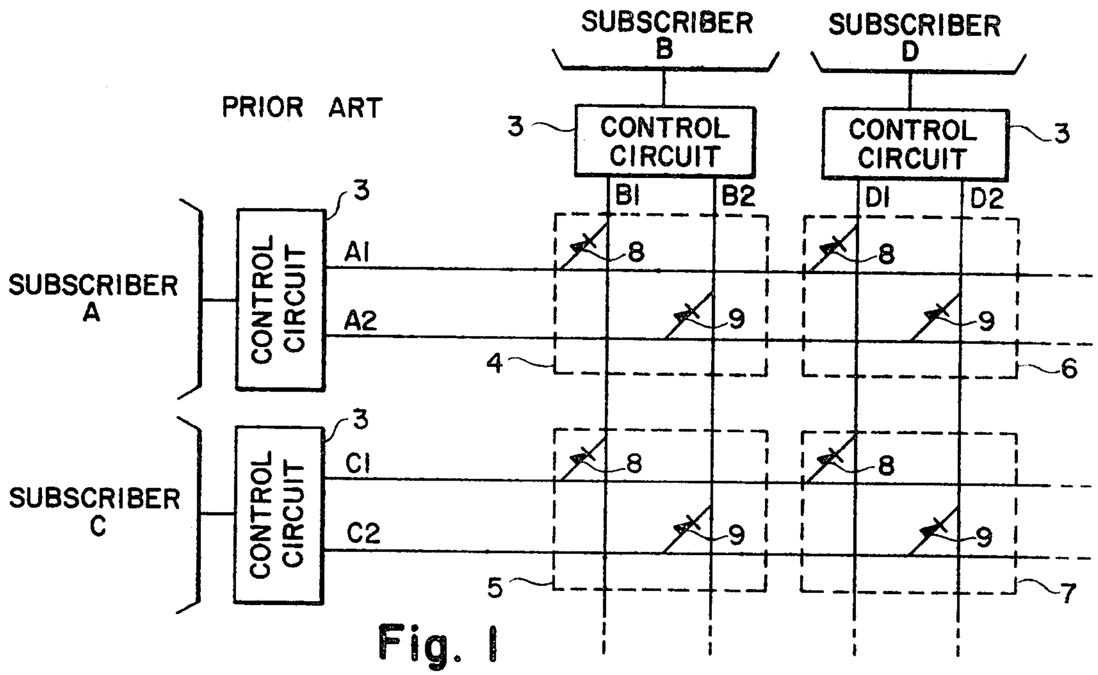

INVENTORS
JAYANTKUMAR BHATT
JOHN G. MLACAK
THOMAS A. WINLOW
BY John E. Mowle
PATENT AGENT

CROSSTALK MINIMIZATION IN MULTI-WIRE NETWORKS

This invention relates to multi-wire switching networks and more particularly to the reduction of crosstalk in such networks.

It is well known in the switching art, that a switching network or matrix may be used to connect one of a predetermined number of input lines to any one of a predetermined number of output lines to complete a transmission path through the network. The input lines are arranged to intersect the output lines and each intersection is termed a crosspoint. Each crosspoint is provided with a switch which, when actuated, connects an input line to an output line. This type of crosspoint switching network has been used extensively in the past, especially in telephone switching offices.

In telephone systems, it is often advantageous to employ two or four-wire networks. In the case of a two-wire network, each crosspoint is formed of a pair of vertical conductors intersecting a pair of horizontal conductors. A pair of switches is used to connect corresponding conductors of the crosspoint.

Of late, it has become increasingly popular to use semiconductor switches such as four-layer or PNPN diodes as crosspoint switches in switching networks. Detailed descriptions of the use and operation of such diodes in telephone networks may be found in the following articles: "The PNPN Diode As A Crosspoint For Electronic Telephone Exchange" by J.E. Flood and W.B. Deller, "The Institution of Electrical Engineers", Paper No. 3377E, November 1960, and "Transmission Network of An Electronic Crosspoint PABX" by R.F. Kowalik in "AIEE Communications and Electronics" November 1961.

One of the major problems encountered in switching networks is that of crosstalk. This problem is accentuated when semiconductor switches are used at the crosspoints because of the junction capacitance of these devices. The problem is even more acute in a two-wire network because two switches are used at every crosspoint. In the existing circuits, this problem is partially alleviated by special biasing arrangements for the diodes and by reducing their junction capacitance to a minimum. However, the capacitance of a semiconductor switch such as a four-layer diode can only be reduced to a certain point, beyond which the manufacturing costs and low yield of acceptable devices is such as to make the cost of a network using semiconductor crosspoints prohibitive.

We have discovered that in addition to the methods mentioned above, the crosstalk in a two-wire switching network may be reduced appreciably by causing the crosstalk to be cancelled within the network at each crosspoint. The invention provides the further advantages that the capacitance of the crosspoint switches do not require to be reduced to an absolute minimum and that the network may be used for the transmission of signals having a frequency much higher than is otherwise possible for any given amount of crosstalk.

In accordance with our invention, we provide each crosspoint of a two-wire network with a pair of capacitive elements each having substantially the same capacitance as that of a non-actuated switch means used for the crosspoint. These elements are connected at the pair of intersections of the horizontal and vertical conductors of the crosspoint other than those at which the switch means are connected.

Figures 2, 3:
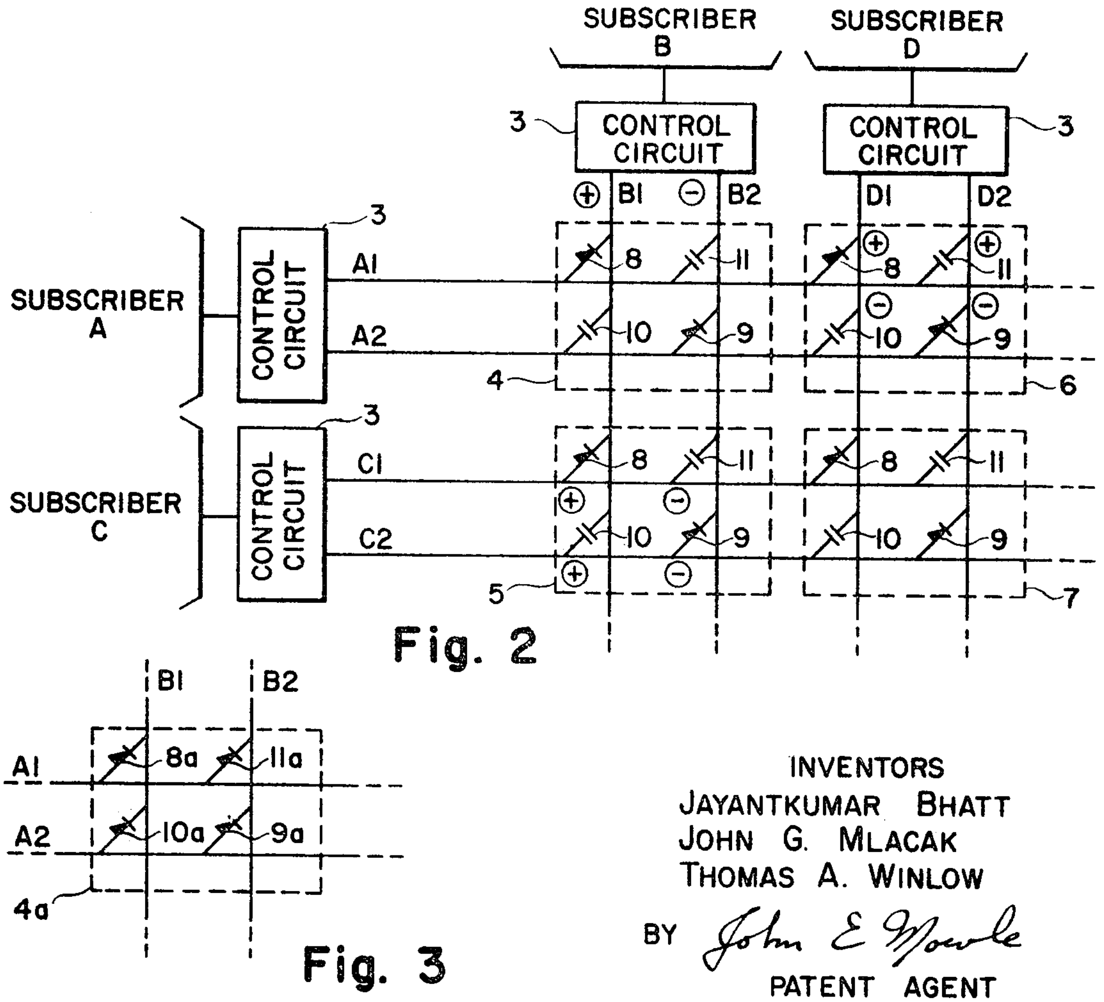

An example embodiment of the invention will now be described with reference to the accompanying drawings in which:

FIG. 1 is a schematic circuit diagram of a prior art two-wire switching network; and FIG. 2 is a schematic circuit diagram of a two-wire switching network in accordance with this invention; and FIG. 3 is a preferred embodiment of one of the crosspoints illustrated in FIG. 2.

FIG. 1 shows a two-wire switching network which may be used to interconnect one of subscribers A and C to one of subscribers B and D. Each of subscribers A, B, C and D has access to the network through a respective control circuit 3. These control circuits which may be junctor or trunk circuits, serve to operate the crosspoints of the network to establish a transmission path therethrough. These types of circuits are well known in the art and are discussed at length in the above-mentioned references.

Subscriber A is connected to a horizontal path of the network by conductors A1 and A2. Subscriber C is connected to the network by conductors C1 and C2, subscriber B by conductors B1 and B2, subscriber D by conductors D1 and D2. The horizontal paths of subscribers A and C intersect the vertical paths of subscribers B and D to form crosspoints 4, 5, 6 and 7 respectively. Each crosspoint is provided with a pair of PNPN diodes 8 and 9 connected across respective vertical and horizontal conductors forming the crosspoint. The network is shown as having only four crosspoints. Of course, this is only illustrative since an actual network may have many time that number.

A non-conducting diode exhibits an inherent predetermined amount of capacitance. For example, let us assume that subscriber A is connected to subscriber B. Therefore, the diodes 8 and 9 of crosspoint 4 are conducting while all of the other diodes are non-conducting. Under these conditions, the diodes 8 and 9 of crosspoints 5, 6 and 7 may be considered to be capacitors. These capacitors will pass a certain amount of the signal which may appear on conductors A1–A2 and B1–B2 into conductors C1–C2 and D1–D2. This signal is unwanted noise and is termed crosstalk. It may be realized that as the network is expanded, the amount of crosstalk increases.

FIG. 2 of the drawings shows a two-wire network in accordance with the invention. The network is identical to that of FIG. 1 with like characters identifying like elements except for capacitive elements 10 and 11 which have been added to each of the crosspoints 4 to 7. These capacitive elements serve to minimize the crosstalk at every crosspoint of the network. The following example will serve to illustrate the mechanism of crosstalk cancellation within the network.

Let us assume as in the previous example in relation to FIG. 1, that subscriber A is talking to subscriber B through the conducting diodes 8 and 9 of crosspoint 4. The diodes of all the other crosspoints are non-conducting. Let us further assume that the instantaneous voltage polarity of the signal on conductors B1 and B2 is as shown in FIG. 2. Conductor B1 is positive relatively to conductor B2. Under these conditions, a positive voltage is coupled through diodes 8 of crosspoints 5 and 6 to conductors C1 and D1. Similarly, a negative voltage is coupled through diodes 9 of crosspoints 5 and 6 to conductors C2 and D2. Effectively, a portion of the signal appearing on A1–A2 and B1–B2 is coupled as crosstalk to conductors C1–C2 and D1–D2. However, it may be seen that the capacitive elements 10 and 11 at every crosspoint function to cancel this crosstalk.

A portion of the positive voltage appearing on conductors A1-B1 is coupled through the capacitive element 10 of crosspoint 5 and the capacitive element 11 of crosspoint 6 to conductors C2 and D2 respectively, thereby effectively cancelling the negative voltages coupled to those conductors through the diodes 9 of the crosspoints 5 and 6. Similarly, a portion of the negative voltage appearing on conductors A2–B2 is coupled through the capacitive element 11 of crosspoint 5 and the capacitive element 10 of crosspoint 6 to conductors C1 and D1 respectively, thereby effectively cancelling the positive voltages coupled to those conductors through the diodes 8 of the crosspoints 5 and 6. Therefore, the crosstalk appearing on conductors C1–C2 and D1–D2 is effectively cancelled by causing an opposite and substantially equal crosstalk to appear on those same conductors.

It should be noted that the closer the capacitive elements 10 and 11 are matched in value to the capacitance of the non-conductive diodes 8 and 9, the greater the minimization of the crosstalk. Therefore, if PNPN diodes are used as diodes 8 and 9 of a crosspoint, it is desirable that the capacitive elements 10 and 11 of the same crosspoint also take the form of PNPN diodes. Since the characteristics of diodes vary with different production runs, it is even more desirable that the four diodes required for each crosspoint be obtained from the same production run. The ideal condition is obtained when the four diodes are manufactured on the same semiconductor chip.

FIG. 3 shows a crosspoint 4*a* having four PNPN diodes 8*a* to 11*a* connected at the intersection of conductors A1–A2 and B1–B2. Under normal operation, the diode 8*a* may be turned on by applying a positive pulse to conductor A1 and a negative pulse to conductor B1. If the amplitude of each of these pulses is slightly greater than one-half of the breakdown voltage of the diode, the potential difference across the diode is greater than its breakdown voltage and the diode is turned on. Then, the diode 9*a* may be turned on in a similar manner by applying positive and negative pulses to conductors A2 and B2 respectively.

Alternatively, positive and negative pulses having an amplitude as defined above may be applied simultaneously to conductors A1–A2 and B1–B2 respectively. In this case, any two diagonally opposite diodes will be turned on depending on which of the four diodes has the lowest breakdown voltage. For example, let us assume that diode 8*a* turns on first. In this case, the voltage across diode 8*a* assumes a very low level (approximately 1 volt) and this voltage appears on conductors A1 and B1. Consequently, the potential difference across diodes 10*a* and 11*a* is now far less than their required breakdown voltage, thereby preventing these diodes from turning on and allowing diode 9*a* to turn on. Therefore, diodes 8*a* and 9*a* now exhibit a low impedance and diodes 10*a* and 11*a* a very high impedance.

As a further example, let us assume that diode 11*a* turns on first. In this case, the voltage across diode 11*a* assumes a very low level which appears on conductors A1 and B2. Consequently, the potential difference across diodes 8*a* and 9*a* is now far less than their required breakdown voltage, thereby preventing them from turning on and allowing diode 10*a* to turn on. In this case, diodes 10*a* and 11*a* exhibit a low impedance and diodes 8*a* and 9*a* a very high impedance. However, when the transmission path through the network includes conductors A1 and A2 or B1 and B2 without requiring the crosspoint 4*a* to be switched, the diodes 8*a* to 11*a* may be considered as capacitive elements and function to cancel crosstalk within the crosspoint as described above in conjunction with FIG. 2.

Although the above description refers entirely to PNPN diodes it should be realized that the principle of the invention is equally applicable to networks using other switch means at their crosspoints. For example, the principle of the invention is also applicable with networks using other types of four-layer diodes, transistors or even crossbar switches. The capacitive elements may also take the form of discrete components although it may prove difficult to match their value to that of the non-actuated switch used as the crosspoint switch means.

As may be surmised from the above description, the instant invention offers important advantages. The capacitance of the switching diodes need not be reduced to an absolute minimum. It is only required that it be matched by that of its complementary capacitive element. Furthermore, a network which uses the present invention may be used for the transmission of signals having a much higher frequency than would be the case with a network not using the cancelling capacitors for a given crosstalk level.

What is claimed is:

1. In a two-wire network having a plurality of crosspoints each formed by the intersection of a vertical path and a horizontal path, each of said paths including first and second conductors, a pair of switch means at each crosspoint for connecting the first and second conductors of the vertical path to the first and second conductors of the horizontal path respectively, each of said switch means having a predetermined capacitance in its off-state, the improvement comprising, a pair of capacitive elements each having substantially the same capacitance as said predetermined capacitance connected between said first and second conductors of said vertical path and said second and first conductors of said horizontal path respectively.

2. A network as defined in claim 1 wherein each of said switch means comprises a semiconductor switch.

3. A network as defined in claim 2 wherein the semiconductor switch is a PNPN diode.

4. A network as defined in claim 3 wherein each of said capacitive elements is a PNPN diode.

5. A network as defined in claim 4 wherein the four PNPN diodes at each crosspoint are formed on the same semiconductor chip.

* * * * *

Disclaimer 3,662,117.—*Jayantkumar Bhatt*, Ottawa, Ontario, *John George Mlacak*, Kanata, Ontario, and *Thomas Arthur Winlow*, Ottawa, Ontario, Canada. CROSSTALK MINIMIZATION IN MULTI-WIRE NETWORKS. Patent dated May 9, 1972. Disclaimer filed Oct. 10, 1972, by the assignee, *Northern Electric Company Limited.*

Hereby enters this disclaimer to claims 1 to 3 inclusive, of said patent.

[*Official Gazette December 26, 1972.*]